United States Patent [19]

Wachtel

[11] 4,186,020
[45] Jan. 29, 1980

[54] FLUORESCENT INK FOR AUTOMATIC IDENTIFICATION

[75] Inventor: Joseph Wachtel, Buffalo Grove, Ill.

[73] Assignee: A. B. Dick Company, Niles, Ill.

[21] Appl. No.: 691,333

[22] Filed: Jun. 1, 1976

Related U.S. Application Data

[63] Continuation-in-part of Ser. No. 520,380, Nov. 4, 1974, abandoned.

[51] Int. Cl.$^2$ ............................................. C09D 11/14
[52] U.S. Cl. ........................................ 106/22; 106/21; 106/26; 427/157
[58] Field of Search ........................ 106/21, 22, 23, 26; 252/301.2 R; 427/157, 7; 346/75

[56] References Cited

U.S. PATENT DOCUMENTS

| Re. 25,845 | 8/1965 | D'Alelio et al. | 252/301.2 R |
|---|---|---|---|
| 2,940,937 | 6/1960 | O'Brien | 252/301.2 R |
| 2,970,965 | 2/1961 | Switzer | 252/301.2 R |
| 3,201,352 | 8/1965 | Jayme et al. | 252/301.2 R |
| 3,567,647 | 3/1971 | Gerhardt | 252/301.2 R |
| 3,703,628 | 11/1972 | Philipson, Jr. | 346/75 X |
| 3,708,798 | 1/1973 | Hildenbrand et al. | 346/75 X |
| 3,867,302 | 2/1975 | Takano et al. | 252/301.2 R |
| 3,928,226 | 12/1975 | McDonough et al. | 106/21 X |
| 3,951,668 | 4/1976 | Schumacher et al. | 106/20 |
| 4,021,252 | 5/1977 | Banczak et al. | 106/26 |

OTHER PUBLICATIONS

Connelly, J. F., Applying Safety Features and Custom Watermarks, In *IBM* Technical Disclosure Bulletin, vol. 14, No. 9, Feb. 1972.
Godlewski et al., Carbon Coating Formulation with Security Feature, In *IBM* Technical Bulletin, vol. 16, No. 3, Aug. 1973.

*Primary Examiner*—Hosea E. Taylor
*Assistant Examiner*—Amelia B. Yarbrough
*Attorney, Agent, or Firm*—McDougall, Hersh & Scott

[57] ABSTRACT

A fluorescent printing ink for non-impact type application, especially used for coding purposes, in which the fluid ink composition is formulated of an organic solvent base containing 0.005 to 2.0% by weight fluorescent dye, up to 60% by weight resinous binder, up to 5% by weight of an organic brightener, and 0.1 to 3.0% by weight organic phosphor, and which also includes an evaporation retardant in an amount within the range of 2 to 30% by weight and an alkali metal thiocyanate in an amount up to 2% by weight, and in which the ingredients are all dissolved in the organic solvent.

11 Claims, No Drawings

FLUORESCENT INK FOR AUTOMATIC IDENTIFICATION

This application is a continuation-in-part of my copending application Ser. No. 520,380, filed Nov. 4, 1974 now abandoned, and entitled "Fluorescent Ink for Automatic Identification." This invention relates to a fluorescent printing ink which can be applied in sufficient intensity by a non-impact type printer to enable use of electronic equipment capable of reading light reflected or emitted from the printed image in the visual wave length range.

Heretofore such fluorescent ink compositions for identification of coding have been applied to an item by an impact type printer, using a ribbon having a wax coating containing a fluorescent material. The applied image was read for identification by an electronic scanner having a sensitivity to light in the wave length range from 500 nanometers (nm) to above 700 nm. The reader has a maximum sensitivity at 630 to 640 nm with sensitivity of 50% of maximum between 520 and 700 nm. The fluorescent image printed by the impact type of printer has an emission which peaks at about 525 nm. While this level is outside the range for maximum efficiency of the reader, the deficiency can be made up by the volume of coating capable of being applied by impact printing for coding identification.

Attempts have heretofore been made to develop a fluorescent ink composition having an intensity at least equivalent to impact printed coding but such attempts have not led to success because of the insufficient amount of material deposited by non-impact printing and because of interferences or absorptions introduced by the substrate.

Thus it is an object of this invention to produce a fluorescent ink composition which can be applied by a non-impact type printer and read or deciphered by an electronic reader operating within the range previously described; in which the ink composition is characterized by an intensity which is higher than heretofore believed possible; in which the emission of the image printed with the fluorescent ink composition is displaced to a peak at 580 nm wave lengths, and in which the ink can be applied by a "Video Jet" Printer with increased effective intensity.

The invention will hereafter be described with reference to a fluorescent printing ink adapted for use in printing or coding with a jet type printer. It will be understood, however, that the printing inks embodying the features of this invention can be used for printing or coding on suitable substrates by other non-impact type printing, or other imaging devices and equipment, such as electrostatic printing, flexographic printing, or gravure printing.

For a description of a jet printer and its method of operation in use, reference can be made to a Technical Report No. 1722-1 of the Stanford University Electronics Research Laboratory, dated March 1964 and entitled "High Frequency Oscillograph With Electrostatically Deflected Ink Jets."

The basic imaging technique in jet printing involves the use of one or more ink jet assemblies connected to a pressurized source of ink. Each jet includes a very small orifice, usually having a diameter of the order of about 0.0024 inch which is electromagnetically energized by magnetorestrictive or piezoelectric means to emit a continuous stream of uniform droplets of ink at a rate of the order of 33 to 75 kilohertz. The stream of droplets is directed onto the surface of a moving web of paper and is controlled to form printed characters in response to video signals derived from an electronic character generator and in response to an electrostatic deflection system.

Such jet type printers have since become well known to the trade and are commercially available from many sources.

In the early work relating to jet printing, use was made of various types of commercial fountain pen inks. However, generally available inks were unsuitable for use in jet printing because they frequently contained solids which operated to clog the very small orifice of the ink jet.

Commercially available jet printing inks also have the tendency to tip dry when left in the ink jet over short periods of time with the result that the dried ink tended to clog the orifices and prevent flow of ink therethrough on resumption of operation of the jet printer. This deficiency has been overcome by the formulation of the ink composition with suitable evaporation retarder.

In accordance with the practice of this invention, the fluorescent ink composition is formulated of an organic solvent base instead of a water base and in which the ink composition contains as essential ingredients (1) an organic binder or carrier which dissolves in the organic solvent base and does not interfere with the fluorescence of the fluorescent dye or pigment component; (2) one or more fluorescent dye components which dissolve in the binder solution; (3) an organic phosphor, which may be a fluorescent dye or pigment of extremely high intensity and which dissolves in the organic solvent, and, optionally, (4) a brightener, an ionizable metal salt in an amount to maintain the electrical resistivity to below 2,000 ohm-cm and (5) an evaporation retardant.

The invention will hereinafter be described in greater detail by reference to the following examples which are given by way of illustration, but not by way of limitation:

|  | Ex. 1 | Ex. 2 | Ex. 3 | Ex. 4 |
| --- | --- | --- | --- | --- |
| General Electric Organic Phosphor 118-15-3 | 1.3 | 1.3 | 1.3 | 1.3 |
| Day-Glo Brightener HM-35 (1% dye in solution) | 15.6 | 15.6 | 15.6 | 15.6 |
| Day-Glo Strong Yellow Soluble Toner 122-7081 | 11.2 | 10.1 | 10.7 | — |
| Potassium Thiocyanate | 2.0 | 2.0 | 2.0 | 2.0 |
| Acetone | 43.0 | 43.0 | 43.0 | 43.0 |
| Ethylene Glycol Mono Ethyl Ether | 26.9 | 26.9 | 26.9 | 26.9 |
| Effective emission with present readers | 100% | 144% | 151% | 110% |

The values given in the formulations are in percent by weight. The values for effective emission are for the image printed with the ink compositions represented by the examples.

In the above formulations, the Day-Glo Strong Yellow Soluble Toner 122-7081 and the Day-Glo Strong Red Soluble Toner 122-7082 are fluorescent pigments manufactured by Lawter Chemicals, Inc. of Northbrook, Ill., in accordance with the formulations and procedures described in the D'Alelio et al U.S. Pat. No. Re. 25,845. Such toners embody the fluorescent dye component dissolved in resinous material formed by co-condensation of benzoguanamine-formaldehyde with an aryl sulfonamide-formaldehyde. The toner is crushed and ground to a particle size of 1 to 2 microns for use as a pigment in the manufacture of daylight fluorescent coating compositions. Strong Yellow 122-7081 is formulated of a yellow fluorescent dye dissolved in the resinous matrix with a maximum emission peak of 525 to 532 nm wavelength. Strong Reg 122-7082 is formulated of a red fluorescent dye dissolved in the resin matrix with a maximum emission peak of 575 to 595 nm wavelength.

In the practice of this invention, the resinous matrix dissolves in the acetone solvent to function as a binder component in the ink composition while the fluorescent dye component remains dissolved in the solution of the modified sulfonamide resin in the organic solvent.

It will be appreciated that, instead of combining the resin and dye to form a pigment for formulation into the printing ink composition of the invention, the resinous binder component and a soluble fluorescent dye may be introduced as separate components for solution in the organic solvent vehicle although it is preferred to formulate the ink composition of the fluorescent dye component and the resinous binder combined in the form of a pigment of the type described, since the desired ratio, distribution, and size of the materials are easier to control and to maintain.

Instead of using a modified toluene sulfonamide resinous component as the binder, use can be made of other organic solvent soluble high molecular weight or polymeric resinous materials as the binder component introduced separate and apart from or in combination with the fluorescent dye. Such other binder components may be represented by methyl cellulose, ethyl cellulose, acrylic or methacrylic or other $C_1$ to $C_5$ alkyl acrylic polymers, alcohol soluble butyrates, polyamide resins and shellac.

As the fluorescent dye component use can be made of such organic soluble fluorescent dyes as xylene Red B (2,4 disulfo benzoic acid), Rhodemine 6 GDN (ethyl ester of m-monoethylamine phenolphthalein hydrochloride), Azosol Yellow 6 GF (4 amino 1,8 naphthol 2',4' dimethyl phenyl imide), Brilliant Sulfoflavine FFA (3 sulfo 4 amino 1,8 naphthol 4' methyl phenyl imide sodium salt), Rhodemine BX (meta-diethyl amino phenolphthalein hydrochloride). In the above examples, the Day-Glo Yellow Soluble Toner embodies Azosol Yellow 6GF as the dye component and the Day-Glo Strong Red Soluble Toner embodies xylene Red B and Rhodamine BX as toner.

When calculated on the basis of the pigment formed of the resinous matrix with dissolved fluorescent dye component, the pigment concentration of the ink composition may comprise up to 50% by weight of the ink composition, such as up to 30 % by weight of the Day-Glo Strong Yellow Soluble Toner 122-7081 and up to 30% by weight of the Day-Glo Strong Red Soluble Toner 122-7082, and preferably from 5–15% by weight of the pigment, such as from 8.0 to 12.5% by weight of the Day-Glo 122-7081 Yellow and 0.2 to 3.0% by weight of the Day-Glo 122-7082 Red.

The concentration of the fluorescent dye in the printing ink composition can be varied over a fairly wide limit, depending somewhat upon the particular dye component present and the binder component employed in combination therewith. The desired fluorescence can be developed when the fluorescent dye component is present in an amount of at least 0.005% by weight up to an amount of about 2.0% by weight, and preferably in an amount within the range of 0.05 to 1.5% by weight. The desired dye concentration can be incorporated by way of pigments of the type described, when the pigment is formulated to contain 0.1 to 5% by weight of the dye component with the remainder calculated as binder solids.

As the organic solvent, use should be made of highly volatile organic solvents in which the binder and the fluorescent dye components are soluble. For example, instead of acetone formulated in Examples 1–4, use can be made of alcohols such as ethyl alcohol, isopropyl alcohol, propyl alcohol and the like $C_1$ to $C_5$ alcohols; acetate such as ethyl acetate, isopropyl acetate, butyl acetate and the like ethers or esters; glycols, glycol ethers, glycol ethyl acetate; ketones such as methyl ethyl ketone, methyl isobutyl ketone; chlorinated solvents such as methyl chloride, ethyl chloride, and the like. The amount of organic solvent component will depend somewhat upon the type of resinous binder and others of the ingredients used in the ink composition. It is desirable to make use of an amount of solvent sufficient to provide for a viscosity within the range of 1 to 20 centipoises and preferably 1.5 to 10 centipoises. In general, the amount of solvent component employed in the ink composition will range from 30–80% by weight, and preferably 39–70% by weight.

A noticeable effect is obtained when use is made of an organic phosphor present in an amount of as little as 0.1% by weight and up to about 3% by weight. More than 3% by weight can be employed but corresponding increase in the amount of emission is not experienced sufficient to warrant the increase in the amount of phosphor. In fact, some interferences are noticed which reduces the amount of light emission when such increased concentrations of phosphor are employed. Organic phosphors which may be used in the practice of this invention are high intensity fluorescent dyes or pigments characterized by very short rise and decay times and can be excited over a wide range of wave lengths which include: 254–365 nm. Representative of such organic phosphors are heterocyclic phenols and alimido derivatives of benzothiozol, such as the phthalimide methyl derivatives of 2-(2-hydroxyphenol)benzothiazoles described in U.S. Pat. No. 3,723,449, and illustrated by the compounds 2-(2-hydroxy-5-phthalimido methyl phenyl)benzothiazole, marketed by the General Electric Company under the designation 118-15-2, the 2,2'-bis(3-pyridinols) described in U.S. Pat. No. 3,676,448 and No. 3,767,652, and illustrated by 2,2'-bis(3-pyridinol), 2,2'-bis(6-methyl-3-pyridinol), marketed by the General Electric Company under the designation 118-15-4, and the poly(arylenevinylene) described in U.S. Pat. No. 3,701,740 and marketed by the General Electric Company under the designation 118-15-5. These materials have various peak emission wave lengths but it is preferred to make use of such organic phosphor materials which have peak emission in the area of 500–535.

Organic phosphors suitable for use in the practice of this invention are marketed by the General Electric Company under the trade names set forth in the following tabulation which also lists the essential characteristics of the phosphors.

| Compound Number | Fluorescence Color | Peak Emission Wavelength in nm[1] | Spectral Half Width in nm | uv Stability | Melting Point °C. | Solubility in grams/100 ml at 22° C. | | | |
|---|---|---|---|---|---|---|---|---|---|
| | | | | | | Toluene | Heptane | Chloroform | Acetone |
| 118-15-1 | Blue | 443 | 49 | Good | 239–240 | 0.176 | 0.477 | 14.5 | 2.69 |
| 118-15-2 | Yellow | 529 | 69 | Good | ~190 softens, ~250 decomposes* | 0.79 | 0.05 | swells | 0.4 |
| 118-15-3 | Green | 511 | 62 | Good | 132–134 | 6.71 | 2.96 | 17.5 | 3.05 |
| 118-15-4 | Yellow-Green | 513 | 51 | Excellent | 189–190 | 1.86 | 0.097 | 8.7 | 1.26 |
| 118-15-5 | Yellow | 533 | 49 | Fair | ~190 softens and decomposes | 0.37 | 0.016 | 0.26 | 3.1 |

[1]For excitation by either 254 or 365 nm.
*Decomposition rate is very slow

HM-35 is a fluorescent brightener, containing 1% by weight dye component in solution and which emits in the ultraviolet to blue visible light range (below 500 nm). While emission thereof is not in the detector area, it adds to the cascading effect in the total fluorescent ink formulation. Other organic solvent soluble brighteners which may be used are listed in the following tabulation:

| Brightener | C.I.No. Fluorescent Brightener | Source | Peak Emission of Brightener nm | Peak Emission Combination % at 525–530 nm |
|---|---|---|---|---|
| Calcofluor ABT | 158 | Cyanamid | 465 | 100 |
| Calcofluor A2RT | | Cyanamid | 440 | 40 |
| Blancophos SV | 25 | GAF | 440 | 40 |
| Tinopal GS | 47 | Geigy | 460 | 60 |
| Leucophor BSN | 30 | Sandoz | 450 | 50 |
| Paper White SP | 102 | DuPont | 440 | 40 |
| Paper White BP | 28 | DuPont | 440 | 40 |
| No Brightener | | | | 20 |

The amount of brightener employed is limited by its solubility in the solvent system. Generally, when present, the brightener component is employed in the ink composition in an amount up to 5% by weight and preferably in an amount within the range of 0.1% to 2% by weight.

The ethylene glycol monoethyl ether functions in the ink composition as an evaporation retardant which operates to minimize drying of the ink composition and thereby eliminate the problem raised by various jet inks which are caused by drying of the ink in the tip of the nozzle to clog the nozzle and prevent proper usage thereof. Representative of other evaporation retardants which can be used are aliphatic polyols, and preferably alkylene glycols in which the alkylene group preferably contains 2–6 carbon atoms, as represented by ethylene glycol, propylene glycol, butylene glycol, hexylene glycol, including the polyalkylene glycols as represented by diethylene glycol, dipropylene glycol, triethylene glycol, tripropylene glycol, tetraethylene glycol. It is possible to employ commercially available polyalkylene glycols, such as Carbowax 200 or Carbowax 400, which are polyethylene glycols having average molecular weights of about 200 and 400, respectively. In general, it is preferred, when using polyalkylene glycols, to use those materials having an average molecular weight less than 600 since higher molecular weight polyalkylene glycols frequently serve to undesirably increase the viscosity of the ink composition.

As the evaporation retardant, use can also be made of alkyl ether derivatives of the foregoing polyols but in higher concentration because of their higher rate of evaporation. Preferred glycol ethers are the alkyl ethers of alkylene glycols in which the alkyl group contains 1–6 carbon atoms (e.g., methyl, ethyl, propyl, butyl, etc.) and the alkylene group contains 2–6 carbon atoms. Representative of the foregoing glycol ethers are ethylene glycol methyl ether, ethylene glycol ethyl ether, ethylene glycol butyl ether, ethylene glycol hexyl ether, diethylene glycol methyl ether, diethylene glycol ethyl ether, diethylene glycol butyl ether, propylene glycol methyl ether, dipropylene glycol methyl ether, tripropylene glycol methyl ether, ethoxy triglycol (triethylene glycol ethyl ether), methoxy triglycol (triethylene glycol methyl ether), etc. Mixtures of the foregoing glycols and glycol esters can be used and frequently are preferred. Other materials which find excellent use as evaporation retardants in the ink compositions of this invention are certain plasticizers such as the phthalate, sebacate, citrate and adipate esters, and rosin esters such as marketed by Hercules under the trade name Hercolyn D and Petrex SS.

The total amount of the evaporation retardant employed in the composition of the invention can be varied within wide limits depending on the viscosity and rate of evaporation, as discussed above. As will be appreciated by those skilled in the art, the amount depends somewhat on the molecular weight of the glycol and/or glycol ether employed. In general, the glycols constitute from 2–30% by weight of the composition. The glycol ethers may range from 5–40% by weight, and when use is made of a plasticizer or phthalate, adipate, citrate and the like ester, the amount may vary from 1–23% by weight.

The potassium thiocyanate has material effect on the resistivity in ohms-cm of the ink composition. This can be demonstrated by the experiment in which the amount of potassium thiocyanate was varied from 0 to 2% by weight in the ink formulation of Example 3, with the following results:

| % by weight potassium thiocyanate | 0% | .5% | 1.5% | 2.0% |
|---|---|---|---|---|
| Resistivity ohm-cm | 6300 | 1300 | 580 | 390 |

Suitable substrates capable of being coded or printed with ink compositions representative of the practice of this invention, and by non-impact type printing processes, and to which the applied ink can adhere when dry to provide the desired fluorescent response for reading by conventional readers, include plastic films of polyolefin, metal foils, polymer coated cellophane, polyvinylidene chloride films, metal surfaces, wooden surfaces, glass surfaces, paper and the like.

Having described the basic concepts of this invention, the following defines the range of the components making up the non-volatiles of the ink composition embodying the features of this invention.

|  | Broad range % by weight | Narrow range % by weight |
|---|---|---|
| Organic phosphor | 0.1–3.0 | 1.0–1.5 |
| Organic brightener | 0–5 | .01–2.0 |
| Resinous binder | up to 60 | 8–15 |
| Fluorescent dye | 0.005–2.0 | 0.005–2.0 |

It will be understood that changes may be made in the details of formulation and operation without departing from the spirit of the invention, especially as defined in the following claims.

I claim:

1. A fluorescent jet printing ink which is stimulated under ultraviolet light to an emission within the range of 500–700 nm consisting essentially of a solution having an electrical resistivity below 2000 ohm-cm comprising an organic solvent carrier in which the non-solvent components of the ink composition, which are dissolved in the organic solvent carrier, consist essentially of (1) solvent soluble organic phosphor, (2) solvent soluble organic brightener, (3) solvent soluble fluorescent dye components, (4) solvent soluble organic binder which does not interfere with the fluorescence of the fluorescent dye, and (5) an ionizable metal salt, and in which the binder is selected from the group consisting of a modified toluene sulfonamide, methyl cellulose, ethyl cellulose, acrylic and alkyl acrylic polymers in which the alkyl group contains from 1 to 5 carbon atoms, alcohol soluble butyrates, polyamide resins and shellac, the components being present in the amount within the range of 0.1 to 3% by weight of the organic phosphor, an amount up to 5% by weight of the organic brightener, up to 60% by weight of resinous binder, and 0.005 to 2.0% by weight of the fluorescent dye, the ionizable metal salt being present in an amount to maintain the electrical resistivity to below 2000 ohm-cm.

2. A fluorescent ink composition as claimed in claim 1 in which the essential components are present in amounts within the range of 1.0 to 1.5% by weight of the organic phosphor, 0.1 to 2% by weight of the organic brightener, 8 to 15% by weight of the resinous binder, and 0.005 to 2.0% by weight of the fluorescent dye.

3. A fluorescent ink composition as claimed in claim 2 in which the fluorescent dye component comprises 8.0 to 12.5% by weight of the Yellow fluorescent dye and 0.2 to 3.0% by weight of the Red fluorescent dye, both of which are dissolved in the binder component formed of an amide aldehyde—aryl sulfonamide resin.

4. A fluorescent ink composition as claimed in claim 1 which includes an evaporation retardant in an amount within the range of 2 to 30% by weight of the ink composition, and in which the evaporation retardant is selected from the group consisting of an aliphatic polyol, a polyalkylene glycol, glycol ethers, glycol esters, esters of phthalic, sebacic, citric and adipic acids, and rosin esters.

5. A fluorescent ink composition as claimed in claim 1 in which the binder is an amide aldehyde—aryl sulfonamide resin.

6. A fluorescent ink composition as claimed in claim 1 which includes an alkali metal thiocyanate in an amount within the range of 0 to 2% by weight.

7. The method of coding or printing with a fluorescent dye comprising a non-impact application of a fluid ink composition comprising an organic solvent base and dissolved in the solvent base as essential components of the ink composition are a solvent soluble fluorescent dye component in an amount within the range of 0.005 to 2.0% by weight, a resinous binder in an amount up to 60% by weight, an organic brightener in an amount within the range of an amount up to 5% by weight, and an organic phosphor in an amount within the range of 0.1 to 3.0% by weight.

8. The method as claimed in claim 7 in which the fluorescent dye is present in an amount within the range of 0.005 to 2.0% by weight, the resinous binder is present in an amount within the range of 8 to 15% by weight, the organic brightener is present in an amount within the range of 0.1 to 2.0% by weight, and the organic phosphor is present in an amount within the range of 0.05 to 1.5% by weight.

9. The method as claimed in claim 7 in which the ink composition is applied by jet printing.

10. The method as claimed in claim 7 in which the ink composition includes an evaporation retardant in an amount within the range of 2 to 20% by weight and in which the evaporation retardant is selected from the group consisting of an aliphatic polyol, a polyalkylene glycol, glycol ethers, glycol esters, esters of phthalic, sebacic, citric and adipic acids, and rosin esters.

11. The method as claimed in claim 7 in which the ink composition contains an alkali metal thiocyanate in an amount up to 2.0% by weight.

* * * * *